(12) United States Patent
Wong

(10) Patent No.: US 9,802,668 B2
(45) Date of Patent: Oct. 31, 2017

(54) STEERING SYSTEM AND BICYCLE USING THE SAME

(71) Applicant: Wan-Hei Wong, Shatin (HK)

(72) Inventor: Wan-Hei Wong, Shatin (HK)

( * ) Notice: Subject to any disclaimer, the term of this patent is extended or adjusted under 35 U.S.C. 154(b) by 8 days.

(21) Appl. No.: 15/029,623

(22) PCT Filed: Oct. 16, 2013

(86) PCT No.: PCT/CN2013/085293
  § 371 (c)(1),
  (2) Date: Apr. 14, 2016

(87) PCT Pub. No.: WO2015/054839
  PCT Pub. Date: Apr. 23, 2015

(65) Prior Publication Data
  US 2016/0236746 A1   Aug. 18, 2016

(51) Int. Cl.
  *B62K 21/12*  (2006.01)
  *B62K 21/18*  (2006.01)
  *B62K 21/26*  (2006.01)
  *B62K 21/02*  (2006.01)

(52) U.S. Cl.
  CPC ............ *B62K 21/125* (2013.01); *B62K 21/18* (2013.01); *B62K 21/26* (2013.01); *B62K 21/02* (2013.01)

(58) Field of Classification Search
  CPC ...... B62K 21/125; B62K 21/18; B62K 21/26; B62K 21/02
  USPC ......................................... 280/279
  IPC ................... B62K 21/125,21/18, 21/126, 21/02
  See application file for complete search history.

(56) References Cited

U.S. PATENT DOCUMENTS 4,437,677 A * 3/1984 Ksayian .................. B62M 1/12
                                                    280/234
2009/0095115 A1* 4/2009 Lee ........................ B62K 3/005
                                                    74/496

* cited by examiner

*Primary Examiner* — Anne Marie M Boehler
*Assistant Examiner* — Felicia L. Brittman
(74) *Attorney, Agent, or Firm* — Chieh-Mei Wang

(57) ABSTRACT

A steering system includes a front fork, a front wheel, a handlebar, two bar ends, and two steering members. The handlebar includes a support bar and two elbows disposed at two opposite ends of the support bar. The two bar ends each includes a grip and a linkage; the linkage fits through the corresponding elbow and connects with the grip. Each of the steering members connects the corresponding bar end to the front fork, so that the swing direction of the grips determines the turning direction of the front fork and thus the travel direction of the front wheel. A bicycle using the steering system is also provided. The steering system and the bicycle of the present invention utilize swinging of the grips of the bar ends connected to the two elbows extending from the handlebar to control the travel direction of the front wheel.

18 Claims, 6 Drawing Sheets

STEERING SYSTEM AND BICYCLE USING THE SAME

FIELD OF THE INVENTION

The present invention relates to a steering system, and more particularly to a steering system and a bicycle using the same.

BACKGROUND OF THE INVENTION

Bicycles have been a common tool of transportation. They are light in weight, convenient and environmentally friendly, therefore have great commercial potential in the modern society.

In general, bicycles include a steering system, a drive system and a brake system. The steering system typically includes a head tube, a handlebar, a front fork, and front axle and a front wheel. Bicycle riders may change the travel direction and maintain balance by maneuvering the handlebar. Handlebars available on the current market can be categorized into curved handlebars and aero handlebars. A typical aero handlebar includes inner bars and outer bars; riders can rest their elbows against the inner bars to gain better aerodynamics, such as minimized wind resistance, as well as comfort and higher riding efficiency. Therefore, bicycles with aero handlebars have been a more preferable choice among consumers over those with curved handlebars.

However, having to rest their elbows against the inner bars, riders of bicycles with aero handlebars may find it difficult to control turning of the bicycles and handle emergency situations. To better control the travel direction, the riders would have to move their elbows and hold the outer bars, therefore resulting in increased wind resistance and reduced riding efficiency.

BRIEF SUMMARY OF THE INVENTION

Therefore, the present invention provides a steering system of a bicycle with high riding efficiency and easy maneuverability.

The present invention also provides a bicycle using the steering system.

To achieve the aforementioned advantages, an embodiment of the present invention provides a steering system, including a front fork, a front wheel, a handlebar, a first bar end and a second bar end, and a first steering member and a second steering member. The handlebar includes a support bar and a first elbow and a second elbow disposed at two opposite ends of the support bar. The first bar end and the second bar end each includes a grip and a linkage; the linkage fits through the corresponding elbow and connects with the grip. The first steering member and the second steering member connect the corresponding bar ends to the front fork, so that the swing direction of the grips determines the turning direction of the front fork and thus the travel direction of the front wheel.

Another embodiment of the present invention provides a bicycle using a steering system. The steering system includes a front fork, a front wheel, a handlebar, a first bar end and a second bar end, and a first steering member and a second steering member. The handlebar includes a support bar and a first elbow and a second elbow disposed at two opposite ends of the support bar. The first bar end and the second bar end each includes a grip and a linkage; the linkage fits through the corresponding elbow and connects with the grip. The first steering member and the second steering member connect the corresponding bar ends to the front fork, so that the swing direction of the grips determines the turning direction of the front fork and thus the travel direction of the front wheel.

The steering system and the bicycle according to the embodiments of the present invention utilize swinging of the grips of the bar ends connected to the two elbows extending from the handlebar to control the travel direction of the front wheel, and therefore provides excellent riding efficiency and easy maneuverability.

For making the above and other purposes, features and benefits become more readily apparent to those ordinarily skilled in the art, the preferred embodiments and the detailed descriptions with accompanying drawings will be put forward in the following descriptions.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE INVENTION

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Embodiment I

Figure 1:
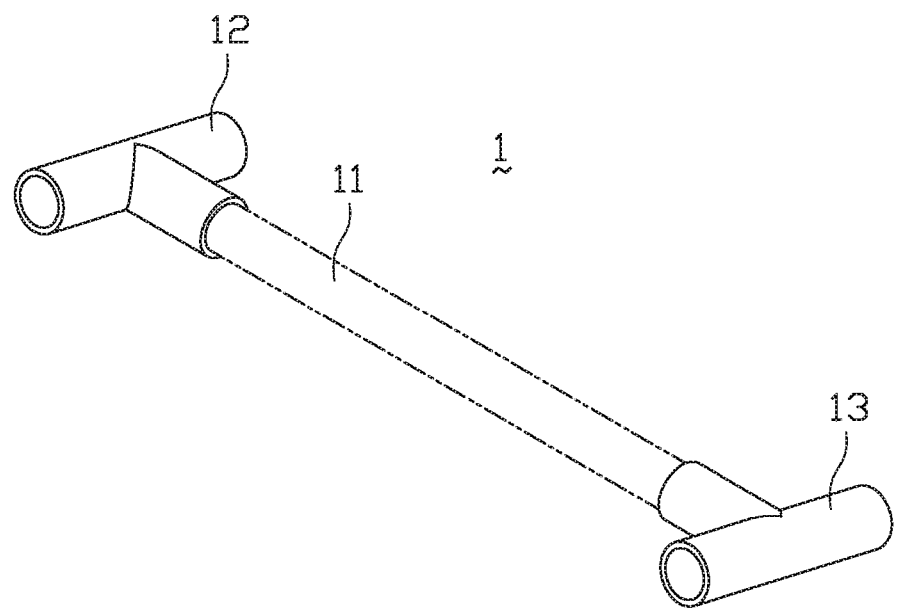
FIG. 1 is a schematic illustration of the structure of a handlebar according to the first embodiment of the present invention.

Referring now to FIG. 1. As illustrated in FIG. 1, the handlebar 1 of the first embodiment includes a support bar 11 and a first elbow 12 and a second elbow 13 disposed at two opposite ends of the support bar 11. In the present embodiment, the first elbow 12 and the second elbow 13 are both perpendicular to the support bar 11. In other embodiments however, the angle between the support bar 11 and the first elbow 12 or the second elbow 13 may be, but is not limited to, 80 degree.

Additionally, the first elbow 12 and/or the second elbow 13 are hollow cylindrical in the present embodiment. In other embodiments however, the first elbow 12 and/or the second elbow 13 may be, but is not limited to, solid spherical.

Figure 2:
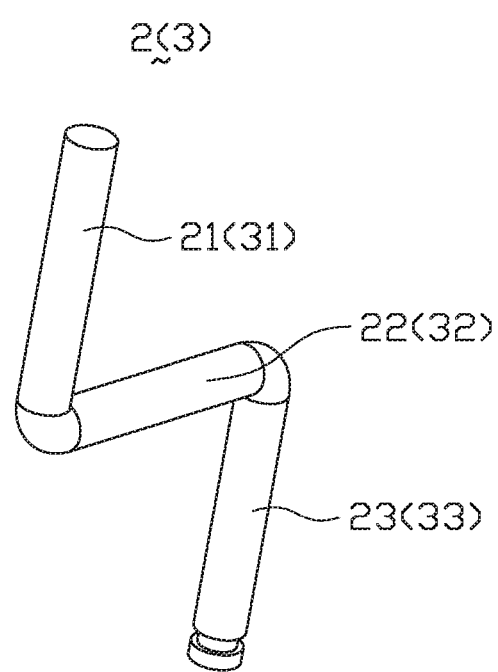
FIG. 2 is a schematic illustration of the structure of a bar end according to the first embodiment of the present invention.

Referring now to FIG. 2. As illustrated in FIG. 2, the first bar end 2 of the first embodiment each includes a grip 21, a linkage 23, and a swing member 23. The second bar end 3 of the first embodiment also includes a grip 31, a linkage 33, and a swing member 33. The grip 21 and the swing member 23 of the first bar end 2 are disposed at two opposite ends of the corresponding linkage 22, which drives the swing member 23 to swing along with the grip 21. Similarly, the grip 31 and the swing member 33 of the second bar end 3 are disposed at two opposite ends of the linkage 32, which drives the swing member 33 to swing along with the grip 31.

In the present embodiment, the linkage 22/32 is perpendicular to both the grip 21/31 and the swing member 23/33, and the grip 21/31 is parallel to the swing member 23/33. However, it is to be understood that the angle between the linkage 22/32 and the grip 21/31 and the angle between the linkage 22/32 and the swing member 23/33 are not limited to any specific angles.

In the present embodiment, the grip, the linkage and the swing member of the first bar end 2 and/or the second bar end 3 are cylindrical. In other embodiments however, the grips, the linkages and the swing members may be, but are not limited to, spherical.

Figure 3:
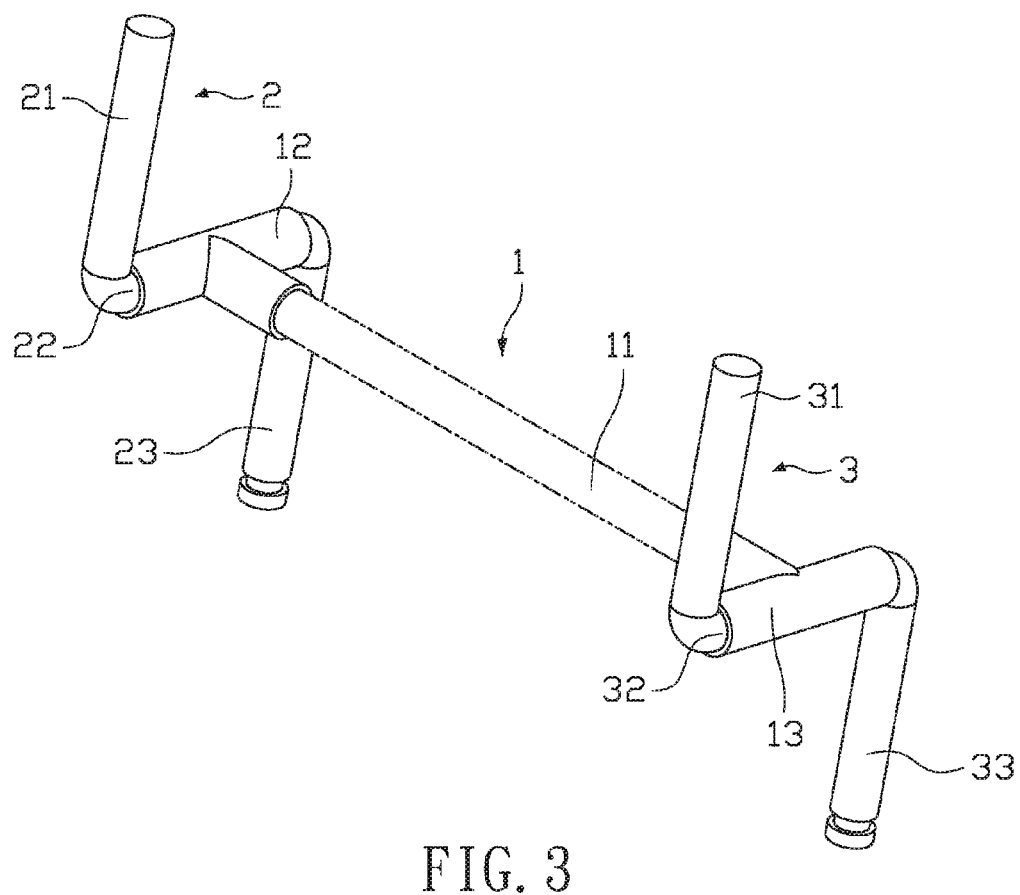
FIG. 3 is a schematic illustration of the structural connection between the bar ends and elbows according to the first embodiment of the present invention.

Referring now to FIG. 3. As illustrated in FIG. 3, the linkage 22 of the first bar end 2 fits through the first elbow 12, and the linkage 32 of the second bar end 3 fits through the second elbow 13. The distances between the grips of the first bar end 2 and/or the second bar end 3 and the corresponding elbows 12/13 may be adjustable.

In the present embodiment, the linkages 22/32 of the first bar end 2 and the second bar end 3 extend over two opposite ends of the corresponding elbows 12/13; that is, the linkages 23/32 are parallel to the corresponding elbows 12/13. However, in other embodiments, the linkages may pass through the elbows at any defined angle.

Figure 4:
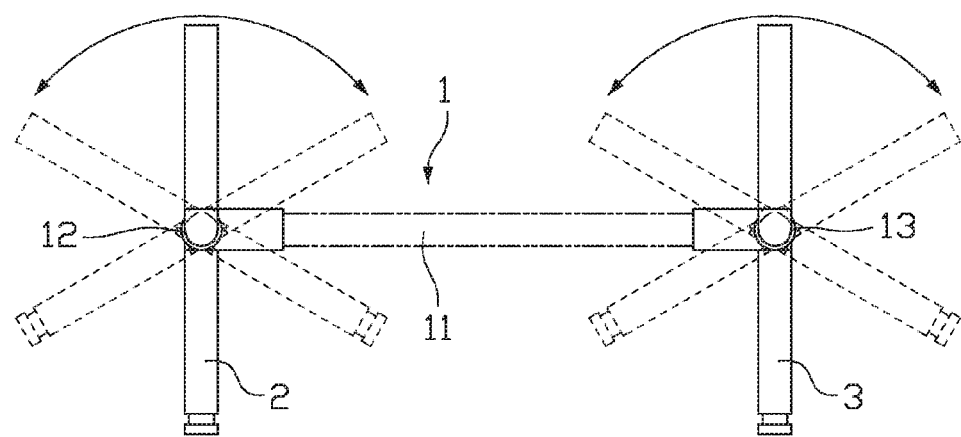
FIG. 4 is a schematic illustration of the actuation mechanism of the bar ends according to the third embodiment of the present invention.

Referring also to FIG. 4. As illustrated in FIG. 4, the swing member 23 of the first bar end 2 would swing leftward and rightward along with the grip 21 during operation. Similarly, the swing member 33 of the second bar end 3 would also swing leftward and rightward along with the grip 31.

Figure 5:
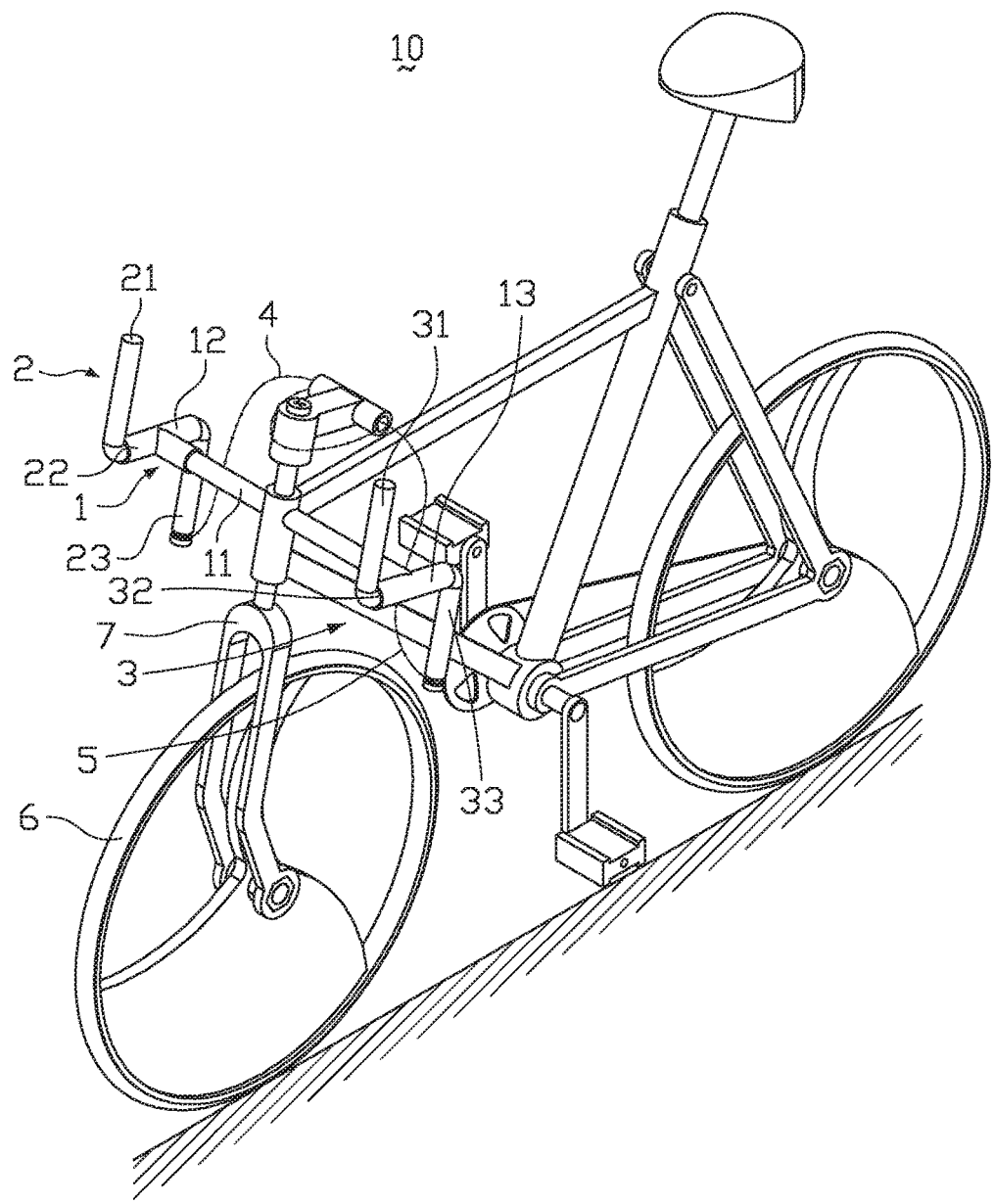
FIG. 5 is a schematic illustration of the structure of a steering system according to the first embodiment of the present invention.

Referring now to FIG. 5. As illustrated in FIG. 5, the steering system 10 of the present embodiment includes the handlebar 1, the first bar end 2, the second bar end 3, a first steering member 4, a second steering member 5, a front wheel 6, and a front wheel 7. The first steering member 4 connects the swing member 23 of the first bar end 2 to the front fork 7, so that swinging of the swing member 23 controls the turning direction of the front fork 7 and thus the travel direction of the front wheel 6. Similarly, the second steering member 5 connects the swing member 33 of second bar end 3 also to the front fork 7, so that swinging of the swing member 33 also controls the turning direction of the front fork 7 and thus the travel direction of the front wheel 6.

In the present embodiment, the first steering member 4 and the second steering member 5 are iron cables. However, in other embodiments, the first steering member 4 and the second steering member 5 may be gears, belts, or other steering components.

In the present embodiment, the first steering member 4 and the second steering member 5 are one continuous iron cable that wraps around the front fork 7. However, in other embodiments, the first steering member 4 and the second steering member 5 may be two separate iron cables that are secured onto the front fork 7 respectively.

Figure 6:
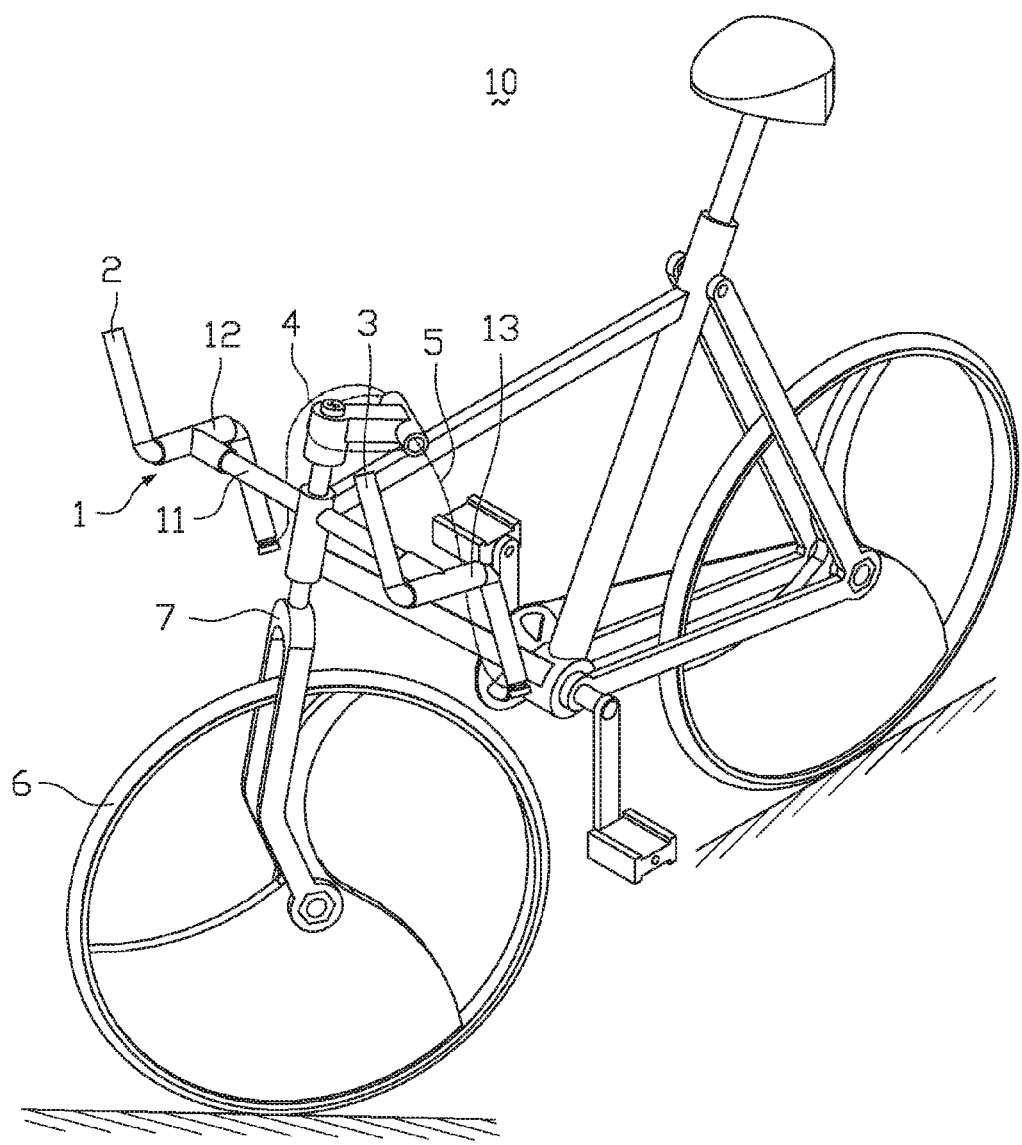
FIG. 6 is a schematic illustration of the rightward turning mechanism of the steering system according to the first embodiment of the present invention.

Referring now to FIG. 6. As illustrated in FIG. 6, when the grips of the first bar end 2 and the second bar end 3 are both swung to the right, the swing members 23 and 33 swing to the left. As such, the swing member 33 of the second bar end 3 moves away from the front fork 7, and the second steering member 5 pulls against the front fork 7, causing the front fork 7 to turn rightward and therefore the front wheel 6 to make a right turn.

Figure 7:
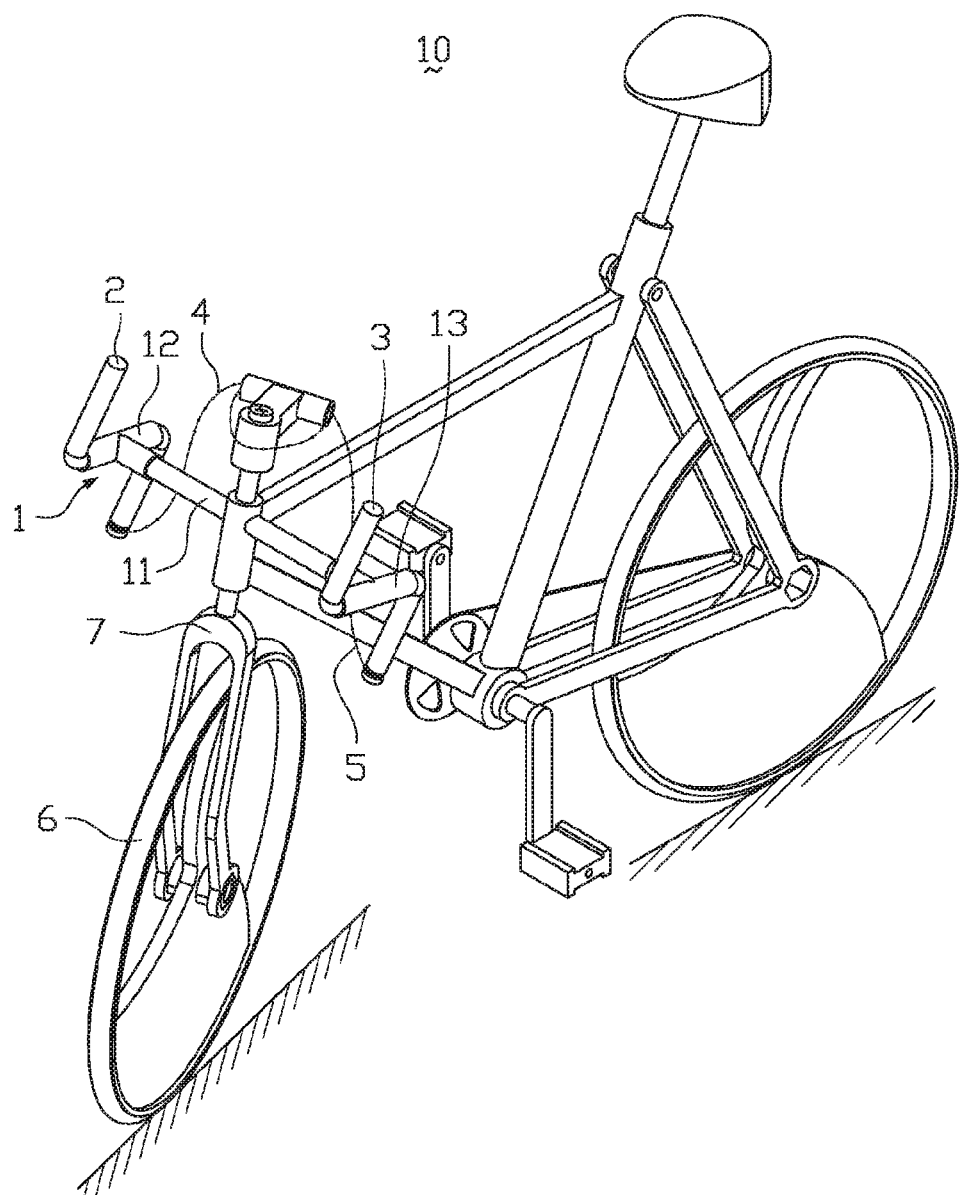
FIG. 7 is a schematic illustration of the leftward turning mechanism of the steering system according to the first embodiment of the present invention.

Referring now to FIG. 7. As illustrated in FIG. 7, when the grips of the first bar end 2 and the second bar end 3 are both swung to the left, the swing members 23 and 33 swing to the right. As such, the swing member 23 of the first bar end 2 moves away from the front fork 7, and the first steering member 4 pulls against the front fork 7, causing the front fork 7 to turn leftward and therefore the front wheel 6 to make a left turn.

Embodiment II

Figure 8:
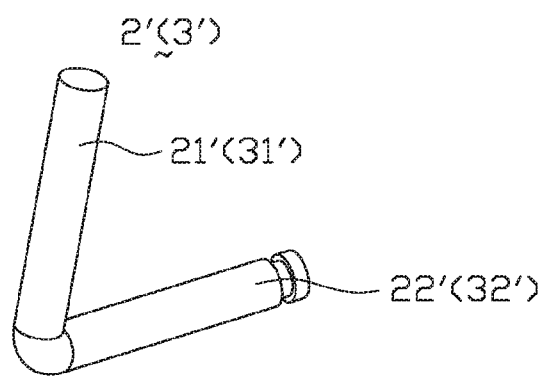
FIG. 8 is a schematic illustration of a bar end according to the second embodiment of the present invention.

Referring now to FIG. 8. The bar end 2'/3' illustrated in FIG. 8 is essentially identical to the bar end 2/3 in FIG. 2. The difference lies in that the first bar end 2' only includes a grip 21' and a linkage 22' and that the second bar end 3' only includes a grip 31' and a linkage 32'.

Figure 9:
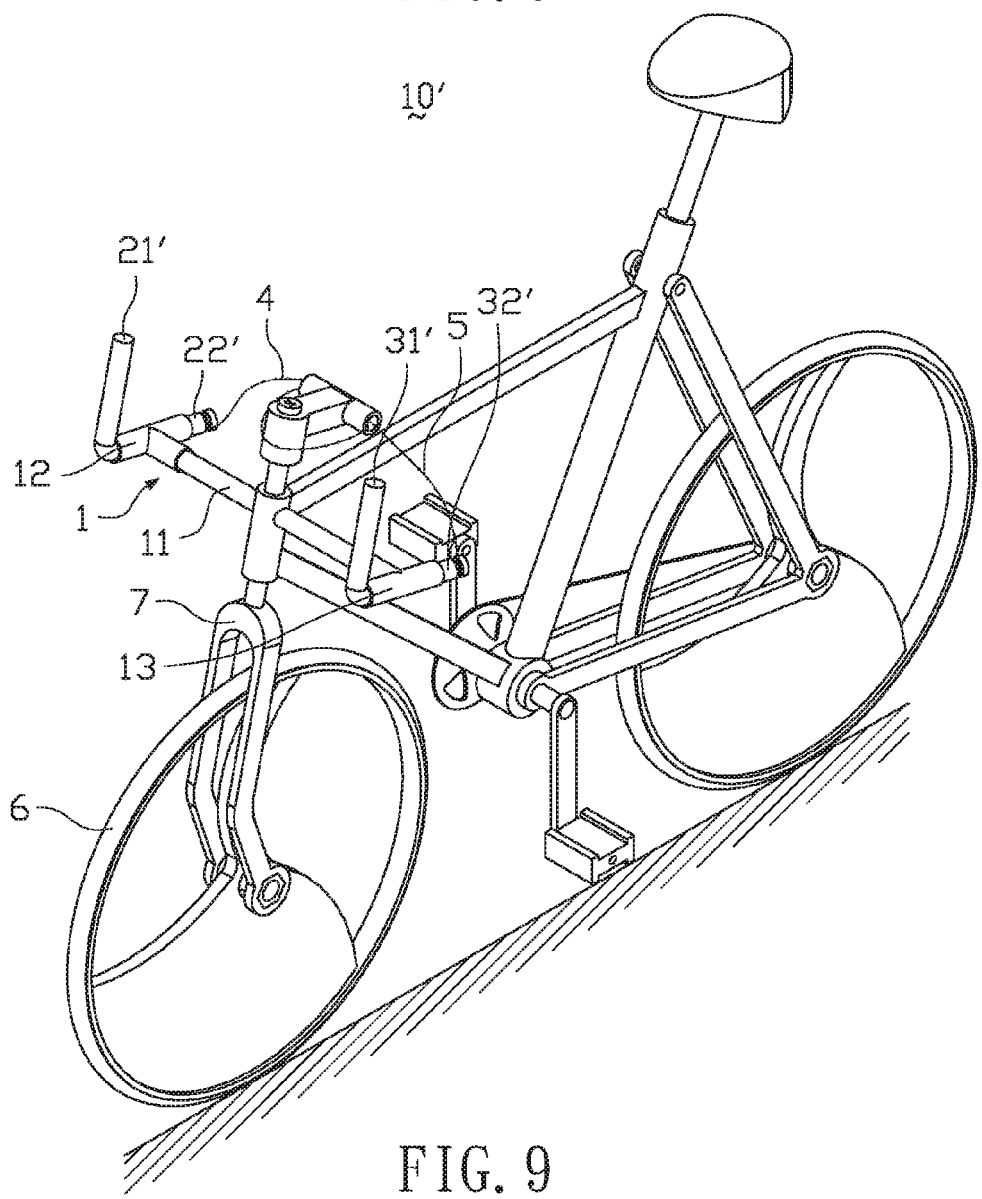
FIG. 9 is a schematic illustration of the structure of a steering system according to the second embodiment of the present invention.

Referring now to FIG. 9. The steering system 10' illustrated in FIG. 9 is essentially identical to the steering system 10 in FIG. 5. The difference lies in that the first steering member 4 is connected to the linkage 22' of the first bar end 2' and the front fork 7 and the second steering member 5 is connected to the linkage 32' of the second bar end 3' and the front fork 7, so that the rotation direction of the linkage 22' of the first bar end 2' and the rotation direction of the linkage 32' of the second bar end 3' determine the turning direction of the front fork 7 and thus the travel direction of the front wheel 6. The actuation mechanism of the steering system 10' as illustrated in FIG. 9 is identical to that of the steering system 10 in FIG. 5, and is therefore not repeated herein.

The present invention also provides a bicycle using the steering system 10' illustrated in FIG. 9. The steering system 10' includes a handlebar 1, a first bar end 2' and a second bar end 3', and a first steering member 4 and a second steering member 5, a front wheel 6, and a front fork 7. The handlebar 1 includes a support bar 11 and a first elbow 12 and a second elbow 13 disposed at two opposite ends of the support bar 11. The first bar end 2' and the second bar end 3' each includes a grip 21'/31' and a linkage 22'/32'; the linkage 22'/32' fits through the corresponding elbow 12/13 and connects with the grip 21'/31'. The first steering member 4 and the second steering member 5 connect the corresponding bar ends 12 and 13 to the front fork 7, so that the swing direction of the grips 21' and 31' determines the turning direction of the front fork 7 and thus the travel direction of the front wheel 6.

In sum, the steering system and the bicycle according to the embodiments of the present invention utilize swinging of the grips of the bar ends connected to the two elbows extending from the handlebar to control the travel direction of the front wheel, and therefore provides excellent riding efficiency and easy maneuverability.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A steering system, comprising:
   a front fork;
   a front wheel;
   a handlebar, comprising a support bar and a first elbow and a second elbow disposed at two opposite ends of the support bar;
   a first bar end and a second bar end, the first bar end and the second bar end each comprising a grip and a linkage, wherein the linkage of the first bar end fits through the first elbow and connects with the grip of the first bar end, and the linkage of the second bar end fits through the second elbow and connects with the grip of the second bar end; and
   a first steering member and a second steering member, wherein the first steering member connects the first bar end to the front fork, and the second steering member connects the second bar end to the front fork, so that a swing direction of the grips determines a turning direction of the front fork and thus a travel direction of the front wheel.

2. The steering system according to claim 1, wherein the first steering member connects with the linkage of the first bar end, and the second steering member connects with the linkage of the second bar end.

3. The steering system according to claim 1, wherein the first bar end and the second bar end each further comprise a swing member, the swing member of the first bar end connects with the first steering member, and the swing member of the second bar end connects with the second steering member.

4. The steering system according to claim 3, wherein the swing member and the grip are disposed at two opposite ends of the linkage.

5. The steering system according to claim 3, wherein the linkage is perpendicular to the swing member and the grip.

6. The steering system according to claim 1, wherein at least one of the first elbow and the second elbow is hollow cylindrical.

7. The steering system according to claim 1, wherein the linkage of the first bar end extends over two opposite ends of the first elbow, and the linkage of the second bar end extends over two opposite ends of the second elbow.

8. The steering system according to claim 1, wherein at least one of the grip and the linkage is cylindrical.

9. The steering system according to claim 1, wherein the first steering member and the second steering member are selected from the group consisting of iron cables, gears, and belts.

10. A bicycle comprising a steering system, the steering system comprising:
    a front fork;
    a front wheel;
    a handlebar, comprising a support bar and a first elbow and a second elbow disposed at two opposite ends of the support bar;
    a first bar end and a second bar end, the first bar end and the second bar end each comprising a grip and a linkage, wherein the linkage of the first bar end fits through the first elbow and connects with the grip of the first bar end, and the linkage of the second bar end fits through the second elbow and connects with the grip of the second bar end; and
    a first steering member and a second steering member, wherein the first steering member connects the first bar end to the front fork, and the second steering member connects the second bar end to the front fork, so that a swing direction of the grips determines a turning direction of the front fork and thus a travel direction of the front wheel.

11. The bicycle according to claim 10, wherein the first steering member connects with the linkage of the first bar end, and the second steering member connects with the linkage of the second bar end.

12. The bicycle according to claim 10, wherein the first bar end and the second bar end each further comprise a swing member, the swing member of the first bar end connects with the first steering member, and the swing member of the second bar end connects with the second steering member.

13. The bicycle according to claim 12, wherein the swing member and the grip are disposed at two opposite ends of the linkage.

14. The bicycle according to claim 12, wherein the linkage is perpendicular to the swing member and the grip.

15. The bicycle according to claim 10, wherein at least one of the first elbow and the second elbow is hollow cylindrical.

16. The bicycle according to claim 10, wherein the linkage of the first bar end extends over two opposite ends of the first elbow, and the linkage of the second bar end extends over two opposite ends of the second elbow.

17. The bicycle according to claim 10, wherein at least one of the grip and the linkage is cylindrical.

18. The bicycle according to claim 10, wherein the first steering member and the second steering member are selected from the group consisting of iron cables, gears, and belts.

* * * * *